US006490548B1

(12) United States Patent
Engel

(10) Patent No.: US 6,490,548 B1
(45) Date of Patent: Dec. 3, 2002

(54) MULTILINGUAL ELECTRONIC TRANSFER DICTIONARY CONTAINING TOPICAL CODES AND METHOD OF USE

(75) Inventor: Alan Engel, Rosemont, PA (US)

(73) Assignee: Paterra, Inc., Villanova, PA (US)

( * ) Notice: Subject to any disclaimer, the term of this patent is extended or adjusted under 35 U.S.C. 154(b) by 0 days.

(21) Appl. No.: 09/311,925

(22) Filed: May 14, 1999

(51) Int. Cl.⁷ .............................................. G06F 17/21
(52) U.S. Cl. ......................................... 704/10; 707/100
(58) Field of Search .................. 704/2–9, 10; 707/530, 707/532, 100, 103

(56) References Cited

U.S. PATENT DOCUMENTS

| | | | | |
|---|---|---|---|---|
| 4,703,425 A | * | 10/1987 | Muraki ........................... | 704/2 |
| 4,775,956 A | * | 10/1988 | Kaji et al. ...................... | 704/2 |
| 5,284,386 A | | 2/1994 | Kuo ................................ | 704/7 |
| 5,311,429 A | * | 5/1994 | Tominaga ....................... | 704/2 |
| 5,323,311 A | * | 6/1994 | Fukao et al. ................... | 704/2 |
| 5,357,430 A | * | 10/1994 | Rackow et al. ................ | 704/2 |
| 5,369,763 A | * | 11/1994 | Biles ........................... | 395/600 |
| 5,541,836 A | | 7/1996 | Church et al. ................. | 704/7 |
| 5,873,056 A | | 2/1999 | Liddy et al. ................... | 704/9 |
| 5,963,940 A | * | 10/1999 | Liddy et al. ................... | 707/5 |
| 6,137,911 A | * | 10/2000 | Zhilyaev ....................... | 382/225 |
| 6,269,368 B1 | * | 7/2001 | Diamond ....................... | 707/6 |

OTHER PUBLICATIONS

Wilks, Stator and Guthre., Electric Words: Dictionaries, Computers and Meanings; MIT Press, 1996, pp. 86–89.
Bläser, Bridgette, Lecture Notes on Artificial Intelligence 898; Machine Translation and the Lexicon; Petra Steffens, ed., Spring & Berlin, 1995, pp 158–173.
Lecture Notes on Artificial Intelligence 898; Machine Translation and the Lexicon; Petra Steffens, ed., Spring & Berlin, 1995, pp 131–140.

* cited by examiner

*Primary Examiner*—Patrick N. Edouard
(74) *Attorney, Agent, or Firm*—Elman & Associates; Gerry J. Elman

(57) ABSTRACT

A multilingual electronic transfer dictionary provides for automatic topic disambiguation by including one or more topic codes in definitions contained the dictionary. Automatic topic disambiguation is accomplished by determining the frequencies of topic codes within a block of text. Dictionary entries having more frequently occurring topic codes are preferentially selected over those having less frequently occurring topic codes. When the topic codes are members of a hierarchical topical coding system, such as the International Patent Classification system, an iterative method can be used with starts with a coarser level of the coding system and is repeated at finer levels until an ambiguity is resolved. The dictionary is advantageously used for machine translation, e.g. between Japanese and English.

20 Claims, No Drawings

MULTILINGUAL ELECTRONIC TRANSFER DICTIONARY CONTAINING TOPICAL CODES AND METHOD OF USE

COPYRIGHT

A portion of the disclosure of this patent document contains material which is subject to copyright protection. The copyright owner has no objection to the facsimile reproduction by anyone of the patent disclosure, as it appears in the PTO patent file or records, but otherwise reserves all copyright rights whatsoever. Copyright © 1999 ISTA.

TECHNICAL FIELD

The present invention relates to multilingual electronic dictionaries that may be used for machine translation.

DEFINITIONS

"Multilingual" means pertaining to two or more languages.

Unless the context otherwise requires, the terms "subject", "topic" and "field" are virtually synonymous in this disclosure, as are the terms "dictionary", "glossary" and "lexicon."

BACKGROUND ART

The existence of field-dependent translations of terms has long been a problem for both ordinary human translation and for machine translation. A term in a source language, for example, Japanese, may have more than one translation in a target language, for example, English, depending on the subject, topic or field of the document being translated. For example, the word "soshiki" in Japanese would be translated to the English "tissue" in a medical document, to the English "weave" in the case of textiles, or to the English "microstructure" in the case of metallurgy.

Conventional machine translation programs, for example, Systran®, contain topical dictionaries or glossaries. The user must manually select topical dictionaries appropriate for the document being translated. In this case, there is one dictionary per topic, for example, chemistry or medicine, rather than one topic per dictionary entry or record as in the current invention.

The machine translation program METAL contains three individual lexicons: a German monolingual lexicon, an English monolingual lexicon and a German-English bilingual lexicon (Katherine Koch, "Machine Translation and Terminology Database—Uneasy Bedfellows?" Lecture Notes in Artificial Intelligence 898, Machine Translation and the Lexicon, Petra Steffens, ed., Springer, Berlin, 1995, pp. 131–140.) Semantic information is disclosed only for the monolingual lexicons, not for the bilingual lexicon. Even for the monolingual lexicon, only 15 semantic types are disclosed, such as "abstract", "concrete", "human", "animal" and "process." These are quite different from the topical classifications that are the subject of the current invention.

Brigitte Blaser, in "TransLexis: An Integrated Environment for Lexicon and Terminology Management," Lecture Notes in Artificial Intelligence 898, Machine Translation and the Lexicon, Petra Steffens, ed., Springer, Berlin, 1995, pp. 158–173, discloses the incorporation of concepts, including broader concepts, narrower concepts and related concepts in a lexicon database management system for machine translation. However, this disclosure does not extend to the incorporation of subject codes, notably hierarchical subject codes, in a multilingual electronic dictionary not does it disclose the use of concepts or other subject area information for automatic topic discrimination in machine translation. Notably, these concepts are not subject areas; rather, they constitute the interlingua for interlingua-based machine translation.

Masterson disclosed a means of automatic sense disambiguation for the machine translation of Latin to English in the article "The thesaurus in syntax and semantics," Mechanical Translation, Vol. 4, pp. 1–2, 1957. As described by Wilks, Slator, and Guthrie in Electric Words: Dictionaries, Computers and Meanings, MIT Press, Cambridge, Mass., 1996, pp. 88–89, Masterson disclosed a nonstatistical method using the headings in Roget's Thesaurus.

In this predecessor to interlingua-based machine translation, Masterson disclosed a concept thesaurus for the words in a Latin passage from Virgil's Georgics. Each word stem from the Latin passage was associated with a set of head numbers from Roget's International Thesaurus by translating the word stems into English and selecting the head numbers for the corresponding English words. For example, the three Latin noun stems, "agricola", "terram" and "aratro" have the following heads (where the head words are shown instead of the head numbers):

AGRICOLA: Region, Agriculture
TERRAM: Region, Land, Furrow
ARATRO: Agriculture, Furrow, Convolution In the case of the text, "Agricola incurvo in terram dimovit aratro", the heads that occur more than once are selected into a concept set. In the above example, this yields the following sets:

AGRICOLA: Region, Agriculture
TERRAM: Region, Furrow
ARATRO: Agriculture, Furrow Finally, the English words listed under each head in Roget's Thesaurus are intersected to leave the appropriate translation candidates. In the current example, this yields the following sets:

AGRICOLA: farmer, ploughman
TERRAM: soil, ground
ARATRO: plough, ploughman, rustic Masterson does not disclose a multilingual dictionary, nor does she disclose use of topical codes in a multilingual dictionary for disambiguation.

Kenneth W. Church, William A. Gale and David E. Yarowsky, in U.S. Pat. No. 5,541,836, also disclosed the use of the categories from Roget's Thesaurus in automatically disambiguating word/sense pairs and the use of bilingual bodies of text to train word/sense probability tables. Church et al do not disclose a multilingual dictionary nor do they disclose the use of topical codes in a multilingual dictionary for sense disambiguation.

JuneJei Kuo, in U.S. Pat. No. 5,285,386, "Machine Translation Apparatus Having Means for Translating Polysemous Words Using Dominated Codes", discloses interlingua-based machine translation using semantic codes in the role of the interlingua. While Kuo discloses transfer dictionaries, these are not multilingual transfer dictionaries. Rather they are transfer dictionaries between the semantic codes, the interlingua in this case, and words in the target language.

The requirement of manually selecting a topical dictionary is a barrier to the automated translation of documents such as patent documents that cover many topical areas. Also, the semantic methods of the interlingua-based approaches do not provide for automatically determining the topic of the document being translated. There is a need for a means for automatically determining the most appropriate target definition depending on the topic of the document. Such a means is referred to as "automatic topic disambiguation" in the text below.

Elizabeth Liddy, Woojin Palk and Edmund Szi-li Wu, in U.S. Pat. No. 5,873,056, "Natural Language Processing System for Semantic Vector Representation Which Accounts for Lexical Ambiguity", disclose a monolingual lexical database that contains nonhierarchical subject codes assigned to each word in the database. To avoid unnecessary reiteration of prior teachings, the disclosure of each reference cited herein is hereby incorporated by reference.

SUMMARY OF THE INVENTION

This invention provides a multilingual electronic dictionary comprising a memory that contains a data structure composed of a plurality of records, each record comprising representations of the following: a first term (in a first language), a second term (in a second language), and a topical code. The topical code indicates a topical area in which the second term is a translation of the first term.

Such an electronic dictionary allows for selecting topic-appropriate translations of terms in a textual object in a first language into a second language. This is accomplished by:

(a) providing an electronic dictionary containing records comprising representations of terms in the first language and the second language;

(b) scanning a textual object in the first language to identify each occurrence of a term in the textual object in a record of the electronic dictionary;

(c) inserting each topical code associated with each of the records identified in step (b) into a data structure that provides for counting of the frequency of occurrence of each topical code; and (d) whenever there occur a plurality of terms in the second language corresponding to a term in the first language, selecting the term associated with the most frequently occurring topical code.

In one embodiment of the invention, step (c) is performed by generating a table associating each topical code occurring in the textual object with its frequency of occurrence.

In another embodiment, as illustrated in the Examples below, step (c) is performed by the use of a map class.

In preferred embodiments of the apparatus and methods of this invention, one or more of the terms are represented in Unicode.

In the electronic dictionary of the present invention, each record may optionally include a representation of the part of speech for the first term, or for each term. However this is not a necessary field in the record.

Also, each record may optionally include a representation of the language of the first term and of the language of said second term. Alternatively a specific representation of the language (e.g. its name or a code such as JP indicating Japanese) may be omitted where an indication of the language is inherent in the structure of the record. (e.g. first field is always Japanese; second is always English).

The dictionary of the present invention is not limited to bilingual records, but may be generated with records that accommodate a third language, or any number of languages.

In preferred embodiments of the invention, the topical coding system is a hierarchical one, e.g. the International Patent Classification system.

Such embodiments are desirably used for selecting topic-appropriate translations of terms in a textual object in a first language into a second language by doing the following:

(a) providing an electronic dictionary containing records comprising representations of terms in the first language and the second language along with a topical code from a hierarchical system;

(b) scanning a textual object in the first language to identify each occurrence of a term in the textual object in a record of said electronic dictionary;

(c) inserting each topical code associated with each of the records identified in step (b) into a plurality of data structures that provide for counting of the frequency of occurrence of each topical code at a code at a plurality of levels of the hierarchy; and (d) whenever there occur a plurality of terms in the second language corresponding to a term in the first language, selecting the term associated with the most frequently occurring topical code;

wherein steps (c) and (d) are applied iteratively, first at a coarser level of the topical code hierarchy, then at successively more detailed levels of the topical code hierarchy until topical ambiguities are either completely resolved or resolved to the extent allowed by the most detailed level of the hierarchy.

DISCLOSURE OF INVENTION

The multilingual electronic dictionary of this invention provides for automatic topic disambiguation by including one or more topic codes in definitions contained the dictionary.

A dictionary record according to this invention is part of a data structure contained in a machine-accessible memory. This record contains at least one topic code comprising the following items (with an example of a record for the Japanese term "soshiki" as shown in Table 1):

TABLE 1

| Term in Language 1 (Japanese) | "soshiki" |
|---|---|
| Part of Speech | Noun |
| Term in Language 2 (English) | tissue |
| Part of Speech | Noun |
| Topic Code | A61K 47/38 |

Although the Japanese term is shown in the Tables herein in English characters within quotation marks, in the records of the present invention, a term in a language that uses other than English characters is preferably represented in a customary coding system such as Unicode. Alternatively all terms, optionally including the Topic Code, may for consistency be represented in such a coding system.

The electronic dictionary of the present invention is embodied as a data structure in any form of machine-accessible memory, which may be permanent or transient. For example, the data structure may be stored using means known in the art for digital or other discrete encoding that is readable to produce a physical signal responding to the contents of selected memory locations, as by electromagnetic or optical means. Various magnetic memories are well known, including fixed disc drives, removable diskettes, tape, and cards. Integrated circuit memory modules may also be used in the present invention, including those in a self-contained form such as PCMCIA cards. A dictionary of the present invention may desirably be stored in permanent form, as on CD-ROM or like media.

In accordance with the present invention, the dictionary may be accessed by a general purpose computer running an operating system (e.g. Windows, Mac OS, Unix, Linux, Pick, etc.) suitable to access the memory on which the dictionary is resident (either permanently or transiently) and including suitable application programming. For purpose of exemplification, programming in the C++ language is disclosed herein, but the reader will appreciate that any of a wide variety of programming languages or database applications may alternatively be employed, including, for example, Pascal, Fortran, COBOL, Eiffel, Java; Access, dBase, FoxPro, Paradox, and the like.

A dictionary of the present invention may be incorporated in a standalone, handheld unit, as an enhanced version of translators such as those currently available from Selectronics, Sony EB Electronic Book, and Franklin Computer Corporation. Alternatively, a dictionary and associated programming in accordance with the present invention may be stored on a single general purpose computer or distributed on a CD-ROM; or it may be made available as a service via a network of computers, e.g. an intranet, a wide-area network, or a global communications network such as the Internet.

Although the records illustrated in this disclosure include fields for Part of Speech, the reader should understand that an electronic dictionary of the present invention does not require information as to a term's Part of Speech, and so the present invention may optionally be implemented without any such fields.

A dictionary record according to this invention may contain more than two languages. For example, it may also contain the term in German and French as shown in Table 2 below.

TABLE 2

| Term in Language 1 (Japanese) | "soshiki" |
| Part of Speech | Noun |
| Term in Language 2 (English) | tissue |
| Part of Speech | Noun |
| Term in Language 3 (German) | Gewebe |
| Part of Speech | Noun |
| Term in Language 4 (French) | tissu |
| Part of Speech | Noun |
| Topic Code | A61K 47/38 |

Alternatively, a record representing a term in more than two languages may be structured to include a field for a representation of the language for which each translation is provided. For example: "shoshiki"/Japanese/tissue/English/Gwebe/German/tissu/French/A61K 47/38

A dictionary record according to this invention may contain more than one topic code, as own in the record in Table 3 below.

TABLE 3

| Term in Language 1 (Japanese) | "maku" |
| Part of Speech | Noun |
| Term in Language 2 (English) | membrane |
| Part of Speech | Noun |
| Topic Code 1 | A61K 47/38 |
| Topic Code 2 | B01D 61/36 |

There are several topical code systems in existence that can be used in this invention. This can be a nonhierarchical system such as that disclosed in Appendix A of U.S. Pat. No. 5,873,056. However, hierarchical topical code systems are preferred.

There are several known hierarchical topical code systems that can be used. Examples include the International Patent Classification (IPC) codes, the United States Patent Classifications, the categories of Roget's International Thesaurus®, the Dewey Decimal System, and the Library of Congress Card Catalog Classification system. Other subject codes that may be used include the Longman subject codes disclosed in the Longman Dictionary of Contemporary English published by Longman Group UK Limited, Longman House, Burnt Mill, Harlow, Essex CM22JE, England.

For example, the IPC codes contain five levels of classification as illustrated in Table 4 below.

TABLE 4

| LEVEL | Example |
| --- | --- |
| FAMILY | A |
| CLASS | A61 |
| SUBCLASS | A61K |
| MAIN GROUP | A61K 47 |
| SUBGROUP | A61K 47/38 |

These levels in hierarchical topical code systems present the advantage of granularity. As is disclosed in the Examples below, if an ambiguity cannot be resolved at a shallow level, it may be resolvable at a deeper code level.

The topic codes for a given set of terms can be selected by locating a document that has previously been classified by topic and for which the source term and its translations are appropriate. For example, in translating a Japanese patent document into English, the main IPC code for that document can be used for Japanese-English term pairs that are encountered during translation.

According to this invention, these topic codes are used to determine a favored subject area within which to translate a particular term. Briefly, to determine the favored subject area, the topic codes for part or all of the terms in a particular block of text are counted. The block can be a sentence, a paragraph, a table, a set of text occurring within a certain number of bytes or words, a subdocument, an entire document or any other definable set of text in the source document.

There are several counting methods known to the art. For example, a two-column table comprising topical codes and their corresponding frequencies may be used. The preferred method is a "map" as used in the programming language C++. Descriptions of "map" may be found in Mark Nelson's "C++ Programmer's Guide to the Standard Template Library," IDG Books Worldwide, Inc, Foster City, 1995, or in Microsoft Corporation's "Microsoft® Visual Studio™ 6.0 Development System", 1998 (hereinafter, "MVS"). To quote the latter:

"The template class describes an object that controls a varying-length sequence of elements of type pair<const Key, T>. The first element of each pair is the sort key and the second is its associated value. The sequence is represented in a way that permits lookup, insertion, and removal of an arbitrary element with a number of operations proportional to the logarithm of the number of elements in the sequence (logarithmic time). Moreover, inserting an element invalidates no iterators, and removing an element invalidates only those iterators that point at the removed element."

In the current invention, the topical code or a substring generated from the topical code is assigned to the Key and inserted into the map. The second member of the pair<const Key, T> may be arbitrary as the map only needs to be used for counting the frequencies of the codes.

If a document has been assigned one or more topical codes, for example, IPC codes in the case of patent documents, these assigned codes can optionally be added to the counts of topical codes for the block of text being analyzed. It should be stressed that the use of such document-level assigned codes is optional and that the method of the current invention can be applied to any text.

While there are several coding systems that may be used in this invention, the preferred coding system is the Unicode® wide character set as described in Microsoft Corporation's "Microsoft® Visual Studio™ 6.0 Development System", 1998 as follows:

"Unicode: The Wide Character Set A wide character is a 2-byte multilingual character code. Any character in use in modern computing worldwide, including technical symbols and special publishing characters, can be represented according to the Unicode specification as a wide character. Developed and maintained by a large consortium that includes Microsoft, the Unicode standard is now widely accepted. Because every wide character is always represented in a fixed size of 16 bits, using wide characters simplifies programming with international character sets."

A complete listing of the Unicode® codes preferred for this invention, and especially preferred for encoding Japanese, Chinese and Korean terms for this invention, can be found in The Unicode Consortium, "The Unicode Standard: Worldwide Character Encoding, Version 1.0, Vols. 1 and 2", Addison-Wesley, Reading, Mass., 1992.

EXAMPLES

EXAMPLE I

Bilingual Electronic Dictionary Containing Hierarchical Topical Codes And Methods For Its Use Example Ia. Bilingual Electronic Dictionary Containing Hierarchical Topical Codes 1) Structure of Dictionary Record in Storage With the character coding system being Unicode®, codes belonging to the user domain of the Unicode® system are selected as record and field delimiters as follows:

| | | |
|---|---|---|
| <record> | 0xe000 | // start of record |
| </record> | 0xe001 | // end of record |
| <lang1> | 0xe011 | // start of first language term field |
| </lang1> | 0xe021 | // end of first language term field |
| <lang2> | 0xe013 | // start of second language term field |
| </lang2> | 0xe023 | // end of second language term field |
| <topic> | 0xe0a0 | // start of topical code field |
| </topic> | 0xe0a1 | // end of topical code field |

In the list above, 0xe011 is a hexadecimal representation of the two-byte (16-bit) code consisting of the hexadecimal bytes e0 and 11.

A dictionary entry then has the following sequence of 16-bit codes:

<record><lang1>Japanese term</lang1><lang2>English term</lang2><topic>IPC code</topic></record>

The records in the dictionaries are selected and constructed by manually examining patents in many IPC classifications. For a particular patent in this Example, the language of the patent Japanese is taken as the first language and English is taken as the second language. For a given Japanese term in the patent, the Japanese term is entered into the first language term field and the English translation of that term which is most appropriate for the topic of the patent is entered into the second language term field. The main IPC classification for the patent is entered into the topical code field.

The dictionary is entered into storage using Windows dialog methods as disclosed in David J.

Kruglinski, "Inside Visual C++," 4th Ed., Microsoft Press, 1997 and known to persons knowledgeable in the field.

A simple parse routine known to persons knowledgeable in the field is used to read the dictionary record into active memory as described below.

2) Dictionary File

The dictionary file consists of a sequence in storage of the above dictionary records. It also contains an array of offsets of the dictionary records so that the records can be addressed by the record location number contained in the node elements of the index file.

3) Index File

The index file for the aforesaid dictionary file is a multinodal tree made up of nodes and node elements as follows. There is one tree per language in the dictionary. If the dictionary is only to be used in one direction, for example, from the first language to the second language, only one tree for the source language need be present. Within each node, the node elements are arranged in Unicode® code order according to the key. Ordering of keys is determined by the Unicode® character order. The first 10 characters of a term are contained in the node element for speed. If the term is less than 10 characters in length, the key is terminated by a NULL. For terms 10 or more characters in length, the dictionary record is parsed into memory so that the full term can be compared. (This is a simple variant of the B-tree method disclosed in Donald E. Knuth, "The Art of Computer Programming, Volume 3, Sorting and Searching", Addison-Wesley, Reading, Mass., 1973, pp. 473–476, hereinafter "Knuth".) The choice of 127 elements makes the size of a node 4096 bytes which is the size of a memory page of the Windows® NT operating system as implemented on Intel x86 microprocessors. In the index file, the nodes are aligned on page boundaries so that a single file access reads a complete node into physical memory. Persons knowledgeable in the field can modify the parameters stated herein to the operating system and file structures as deemed appropriate.

a) Node Class:

```
class Node
{
    DWORD       m_ThisNode; // number of this node
    DWORD       m_NumberOfElements;
                // number of node elements currently in node
    DWORD       m_MaxNumberOfElements;
    DWORD       m_ParentNode;
    DWORD       m_ParentElement;
                // number of parent element in parent node
    DWORD       m_FirstElement;
    DWORD       m_bBottomNode; // true if this is a bottom node
    DWORD       m_LastElement; // last element in linked list
    NodeElement m_Elements[127];
};
``` b) Node Element Class:

```
class NodeElement
{
    wchar_t  key[10];     // hold up to 10 characters from
                          record
    DWORD    childNode;   // for keys less than this key
    DWORD    next;        // next element in node
    DWORD    record;      // number of record in dictionary
};
```

4) Structure of Dictionary in Active Memory

When associated with a textual object, the aforementioned dictionary record is parsed into an active object, for example a C++ object having the following member variables where "wstring" is a wide character (Unicode®) string according to MVS:

```
class Record
{
    wstring   wsL1Term;   // term from first language
    wstring   wsL2Term;   // term from second language
    wstring   wsTopic;    // topical code
}
```

Example Ib Use of Bilingual Dictionary in a Single Level Method of Selecting Translations of Terms Using Hierarchical Topical Codes 1) Association of Dictionary Entries with a Textual Object in a First Language Given a first language wstring wsLang1String of length lenL1S, at each position m in the wstring, the index file is searched for first language terms that match wsLang1String starting at position m and copies of these dictionary records are then read into active memory as follows:

a) A CPtrArray paMaster (as described in MVS), is constructed with length lenL1S and initialized with NULL at each position in the array. In operation, this will become an array of arrays, with a CPtrArray paRecords of dictionary records at each position in this array.

Example of paMaster before adding dictionary records, Table 5:

TABLE 5

| paMaster[0] | NULL |
| (intervening paMasters) | (all NULL) |
| paMaster[m] | NULL |
| paMaster[m + 1] | NULL |
| (intervening paMasters) | (all NULL) |
| paMaster[lenL1S-1] | NULL | b) Staring from position 0 in wsLang1String, the index file is searched following the method described in Knuth.

The records in the dictionary for which the first language term matches the substring of wsLang1String of the same length as the first language term are read into active memory as follows:

The record is parsed by sequentially reading each character of the record. Upon reading a <record> code, the program allocates memory for an instance of the class Entry. After reading the <lang1> code, the program places subsequent characters in wsL1Term until the </lang1> code is read. Likewise, after reading the <lang2> code, the program places subsequent characters in wsL2Term until the </lang2> code is read. Continuing, after reading the <topic> code, the program places subsequent characters in wsTopic until the </topic> code is read. Upon reading the </record> code, the program appends the pointer to this record to the CPtrArray at position 0. If this is the first record at that position, i.e., there is a NULL at that position, the program allocates a CPtrArray for the record and assigns its pointer to paMaster[0], then appends the pointer of the new dictionary record to this newly allocated CPtrArray.

c) The procedure in b) is repeated for each position in wsLang1String. When these iterations are complete each position m of paMaster will contain either a NULL (if no matching dictionary records were found) or a pointer to a CPtrArray of dictionary records.

Example of paMaster after adding dictionary records, Table 6:

TABLE 6

| paMaster[0] | *paRecords ($0^{th}$) |
| (intervening paMasters) | (may include NULL) |
| paMaster[m] | *paRecords ($m^{th}$) |
| paMaster[m + 1] | NULL |
| (intervening paMasters) | (may include NULL) |
| paMaster[lenL1S-1] | *paRecords ( $(lenL1S-1)^{th}$ ) |
| | (may be NULL) |

In this example, NULL entries remain where no matching dictionary entries were found.

An example of a paRecord after adding dictionary records is shown below. In this case, three matching records were found and copied into active memory, Table 7.

TABLE 7

| paRecord[0] | Pointer to first record |
| paRecord[1] | Pointer to second record |
| PaRecord[2] | Pointer to third record |

2) Inserting Topical Codes Into a Structure that Allows for Counting their Frequencies of Occurrence For each member of the pointer array, a key consisting of the first three characters of the IPC code contained in wsTopic (i.e., the class code) are added to the map defined by:

map<wstring, int> STR2INT;

to get the map

STR2INT smapClassCode;

Following the teachings of MVS for the map template class, the following C++ code segment is executed for each member of paMaster as follows:

```
for(int i = 0; i < lenL1S; i++)
{
    if(paMaster[i] != NULL)
    {
        int nRecords = paMaster[i].GetLength(); // number of dictionary records copied CPtrArray* pRecords = paMaster[I];
```

```
                for(int j = 0; j < nRecords; j++)
                {
                    Record*pRecord = pRecords[j];
                    pair(wstring, int)newPair; // pair for insertion into smapClassCode
                    newPair.first = pRecord- > wsTopic.left(3);
                    newPair.second = 1;
                    smapClassCode.insert(newPair);
                }
            }
        }
```

2a) Alternate Structure and Method for Counting Topical Codes:

Alternatively to using a map structure, a list structure (as disclosed in MVS) can be used by appending each instance of the topical code or the substring derived from the topical code to a list. After all of the topical codes have been appended, this list can be optionally sorted. A vector is then constructed using the following C++ structures:

```
        typedef struct
        {
            wstring     wsCode;
            int         nCount;
        }STRINTPAIR;
        vector(STRINTPAIR)      STRINTARRAY;
        STRINTARRAY staCodeFrequencyTable;
```

For each unique topical code in the list, the number of occurrences of said member in the list is counted, the topical code assigned to wsCode and the count assigned to nCount for a new STRINTPAIR and this STRINTPAIR appended to the STRINTARRAY with the STRINTARRAY::push_back function.

For this implementation, the most frequently occurring topical code is determined by looking up and comparing nCount for the respective topical codes in STRINTARRAY. The alternative structure described hereinabove can be used as an alternative in any of the following examples as well.

3) Selecting Translations of Terms in Second Language Using Frequencies of Topical Codes For each of the positions m of wsLang1String, if there is more than one matching first language terms from the dictionary, the number of occurrences of the first three characters of the IPC code in smapClassCode for the matching first language terms are compared. The term with the most frequent IPC key is selected.

For the particular example of paRecord shown above, the following code segment selects the record with the most frequently occurring IPC code:

```
        int nMostFrequent = 0; // initialize to first record in paRecord
        int nMaxCount = 0; // for following the maximum count
```

```
        for(int i = 0; i < paRecord.GetLength(); i++)
        {
            Record*pRecord = pRecord[i];
            wstring wsTest = pRecord- > wsTopic.left(3);
            int nCount = smapClassCode.count(wsTest);
            if(nCount > nMaxCount)
            {
                nMostFrequent = i;
                nMaxCount = nCount;
            }
        }
```

Note that in this example, if more than one IPC class code has the same frequency the first of the two records to occur in pRecords is selected.

Example Ic. Use of Bilingual Dictionary in a Multilevel Method of Selecting Translations of Terms Using Hierarchical Topical Codes 1) Association of Dictionary Entries with a Textual Object in a First Language This step is the same as for Example Ib above.

2) Inserting Topical Codes into a Structure that Allows for Counting their Frequencies of Occurrence Instead of the single smapClassCode in Example Ib, four maps are constructed, namely, STR2INT smapClassCode; // from IPC code through class level STR2INT smapSubclassCode; // from IPC code through subclass level STR2INT smapG roup // from IPC code through main group level STR2INT smapSubgroup; //PC code through subgroup level In this case, the following C++ code segment is executed for each member of paMaster as follows:

```
for(int i = 0; i < lenL1S; i++)
{
    if(paMaster[i] != NULL)
    {
        int nRecords = paMaster[i].GetLength(); // number of dictionary records copied
        CPtrArray*pRecords = paMaster[I];
        for(int j = 0; j < nRecords; j++)
        {
            Record*pRecord = pRecords[j];
            pair < wstring, int > newPair; // pair for insertion into smapClassCode
            newPair.first = pRecord- > wsTopic.left(3);
            newPair.second = 1;
            smapClassCode.insert(newPair);
            newPair.first = pRecord- > wsTopic.left(4); // IPC code to subclass level
            newPair.second = 1;
            smapSubclassCode.insert(newPair);
            int nGroupDelimiterPosition= wsTopic.find(L'/'); if(
nGroupDelimterPosition== 0)
                nGroupDelimiterPosition= wsTopic.find(L':');
            newPair.first = pRecord- > wsTopic.left(nGroupDelimiterPosition);
                            // IPC code to main group level
            newPair.second = 1;
            smapGroup.insert(newPair);
            newPair.first = pRecord- > wsTopic; // entire IPC code newPair.second = 1;
smapSubgroupCode.insert(newPair);
        }
    }
}
```

3) Selecting Translations of Terms in Target Language Using Frequencies of Topical Codes For each of the positions m of wsLang1String, if there is more than one matching first language terms from the dictionary, the number of occurrences of the first three characters of the IPC code in smapClassCode for the matching first language terms are compared. The term with the most frequent IPC key is selected. If there are still two or more terms with the same numbers of IPC class code occurrences, the numbers of occurrences of the subclass codes in smapSubclassCode are compared. This comparison is repeated until either a single term is selected or a repetition at the subgroup level is completed.

For the particular example of paRecord shown above, the following C++ code segment selects the record with the most frequently occurring IPC code:

```
int nSelectedRecord = 0; // initialize to first record in paRecord int nMostFrequentClass = 0; // initialize to first record in paRecord int nMaxCountClass = 0; // for following the maximum count int nClassRedundancy = 0;

int nMostFrequentSubclass= 0; // initialize to first record in paRecord int nMaxCountSubclass= 0; // for following the maximum count int nSubclassRedundancy= 0;

int nMostFrequentGroup= 0; // initialize to first record in paRecord int nMaxCountGroup= 0; // for
```

-continued

```
following the maximim count int nGroupRedundancy= 0;
int nMostFrequentSubgroup= 0; // initialize to first record in paRecord int nMaxCountSubgroup= 0;
// for following the maximum count int nSubGroupRedundancy= 0; for(int i = 0; i <
paRecord.GetLength(); i++)
{
        Record*pRecord = pRecords[i];
        wstring wsClass = pRecord- > wsTopic.left(3);
        int nCountClass = smapClassCode.count(wsClass);
        if(nCountClass > nMaxCountClass)
        {
                nMostFrequentClass= i;
                nMaxCountClass = nCountClass;
                nClassRedundancy= 1;
        }
        else if(nCountClass == nMaxCountClass)
        {
                nClassRedundancy++;
        }
        wstring wsSubClass = pRecord- > wsTopic.left(4)
        int nCountSubclass= smapSubclassCode.count(wsSubclass);
        if(nCountSubgroup> nMaxCountSubgroup)
        {
                nMostFrequentSubgroup= i;
                nMaxCountSubclass= nCountSubgroup
                nSubclassRedundancy= 1;
        }
        elseif(nCountSubclass== nMaxCountSubclass)
        {
                nClassRedundancy++;
        }
        int nGroupDelimiterPosition= wsTopic.find(L'/');
        if(nGroupDelimiter== 0)
                nGroupDelimiterPosition= wsTopic.find(L':');
        wstring wsGroup = pRecord- > wsTopic.left(nGroupDelimiterPosition);
        int nCount = smapSubclassCode.count(wsGroup);
        if(nCountGroup> nMaxCountGroup)
        {
                nMostFrequentGroup= i;
                nMaxCountGroup= nCountGroup
                nGroupRedundancy= 1;
        }
        elseif(nCountGroup == nMaxCountGroup)
        {
```

```
            nClassRedundancy++;
    }
    wstring wsSubgroup = pRecord- > wsTopic;
    int nCountSubgroup= smapSubgroupCode.count(wsSubgroup);
    if(nCountSubgroup> MaxCountSubgroup)
    {
            nMostFrequentSubgroup= i;
            nMaxCountSubgroup= nCountSubgroup;
            nSubclassRedundancy= 1;
    {
            nClassRedundancy++;
    }
}
if(nClassRedundancy== 1)
        nSelectedRecord = nMostFrequentClass;
elseif(nSubclassRedundancy== 1)
        nSelectedRecord = nMostFrequentSubclass;
elseif(nGroupRedundancy== 1)
        nSelectedRecord = nMostFrequentGroup;
elseif(nSubgroupRedundancy== 1)
        nSelectedRecord = nMostFrequentSubgroup;
```

In this example if there is redundancy at all levels, the first record is selected.

Example Id. Use of Bilingual Dictionary in a Single Level Method of Selecting Translations of Terms Using Hierarchical Topical Codes, Additionally Using Topical Codes Assigned to the Document as a Whole.

This method applies to a patent or patent application for which IPC classifications have been assigned and whose codes are included in the bibliographic portion of the document.

1) Association of Dictionary Entries with a Textual Object in a First Language

This step is the same as for Example Ib above.

2) Inserting Topical Codes Into a Structure that Allows for Counting their Frequencies of Occurrence This step is the same as for II above with the exception that the Subclass codes of the bibliographic IPC codes are also added to smapClassCode. This is done by assigning each IPC code for the document to a wstring wsIPCCode and adding these to smapClassCode with the following C++ code segment:

```
for(each IPC code in bibliographic header) // pseudocode
{
        pair(wstring, int)newPair; // pair for insertion into smapClassCode
        newPair.first = pRecord- > wsIPCCode.left(3);
        newPair.second = 1;
        smapClassCode.insert(newPair);
}
for(int i 0; i < lenL1S; i++)
{
        if(paMaster[i] != NULL)
        {
                int nRecords = paMaster[i].GetLength(); // number of dictionary records copied
                CPtrArray* pRecords = paMaster[I];
```

-continued

```
for(int j = 0; j < nRecords; j++)
{
    Record*pRecord = pRecords[j];

pair(wstring, int)newPair; // pair for insertion into smapClassCode newPair.first = pRecord- > wsTopic.left(3);

newPair.second = 1;

smapClassCode.insert(newPair);

}
}
}
```

3) Selecting Translations of Terms in Second Language Using Frequencies of Topical Codes This step is the same as for Example Ib above.

EXAMPLE II

Multilingual Electronic Dictionary Containing Hierarchical Topical Codes and Method for Its Use
Example IIA. Multilingual Electronic Dictionary Containing Hierarchical Topical Codes 1) Structure of Dictionary Record in Storage With the character coding system being Unicode®, codes belonging to the user domain of the Unicode® system are selected as record and field delimiters as follows:

| | | |
|---|---|---|
| <record> | 0xe000 | //start of record |
| </record> | 0xe001 | //end of record |
| <lang1> | 0xe010 | //start of first language term field |
| </lang1> | 0xe011 | //end of first language term field |
| <lang2> | 0xe020 | //start of second language term field |
| </lang2> | 0xe021 | //end of second language term field |
| <lang3> | 0xe030 | //start of third language term field |
| </lang3> | 0xe031 | //end of third language term field |
| <lang4> | 0xe040 | //start of fourth language term field |
| </lang4> | 0xe041 | //end of fourth language term field |
| <topic> | 0xe0a0 | //start of topical code field |
| </topic> | 0xe0a1 | //end of topical code field |

In the list above, 0xE011 is a hexadecimal representation of the two-byte (16-bit) code consisting of the hexadecimal bytes E0 and 11.

A dictionary entry then has the following sequence of 16-bit codes:

<record><lang1> Japanese term</lang1><lang2> English term </lang2><lang3> German term </lang3><lang4> French term</lang4><topic> IPC code</topic></record>

The records in the dictionaries are selected and constructed by manually examining patents in many IPC classifications. For a particular patent in this Example, the language of the patent Japanese is taken as the first language, English as the second language, German as the third language and French as the fourth language. For a given Japanese term in the patent, the Japanese term is entered into the first language term field and the English translation of that term which is most appropriate for the topic of the patent is entered into the second language term field. Likewise, the appropriate German and French terms are entered into their respective fields. The main IPC classification for the patent is entered into the topical code field.

A simple parse routine known to persons knowledgeable in the field is used to read the dictionary record into active memory.

2) Dictionary File

The dictionary file consists of a sequence in storage of the above dictionary records. It also contains an array of offsets of the dictionary records so that the records can be addressed by the record location number contained in the node elements of the index file.

3) Index File

The index file for the aforesaid dictionary file is a multinodal tree made up of nodes and node elements as follows. There is one tree per language in the dictionary. If the dictionary is only to be used in one direction, for example, from the first language to the second, third and fourth languages, only one tree for the first language need be present. Within each node, the node elements are arranged in Unicode® code order according to the key. Ordering of keys is determined by the Unicode® character order. The first 10 characters of a term are contained in the node element for speed. If the term is less than 10 characters in length, the key is terminated by a NULL. For terms 10 or more characters in length, the dictionary record is parsed into memory so that the full term can be compared. (This is a simple variant of the B-tree method disclosed in Donald E. Knuth, "The Art of Computer Programming, Volume 3, Sorting and Searching", Addison-Wesley, Reading, Mass., 1973, pp.473–476.) The choice of 127 elements makes the size of a node 4096 bytes which is the size of a memory page of the Windows® NT operating system as implemented on Intel x86 microprocessors. In the index file, the nodes are aligned on page boundaries so that a single file access reads a complete node into physical memory.

a) Node Class

```
class Node
{
    DWORD       m_ThisNode; //number of this node
    DWORD       m_NumberOfElements; //number of node elements
                currently in node
    DWORD       m_MaxNumberOfElements;
    DWORD       m_ParentNode;
    DWORD       m_ParentElement; //number of parent element in
                parent node
    DWORD       m_FirstElement;
    DWORD       m_bBottomNode; //true if this is a bottom node
    DWORD       m_LastElement; //last element in linked list
    NodeElement m_Elements[127];
};
``` b) Node Element Class:

```
class NodeElement
{
    wchar_t    key[10];      //hold up to 10 characters from record
    DWORD      childNode;    //for keys less than this key
    DWORD      next;         //next element in node
    DWORD      record;       //number of record in dictionary
};
```

4) Structure of Dictionary in Active Memory

When associated with a textual object, the aforementioned dictionary record is parsed into an active object, for example a C++ object having the following member variables where "wstring" is a wide character (Unicode®) string according to MVS:

```
class Record
}
    wstring    wsL1Term;    //term from first language
    wstring    wsL2Term;    //term from second language
    wstring    wsL3Term;    //term from third language
    wstring    wsL4Term;    //term from fourth language
    wstring    wsTopic;     //topical code
}
```

Example IIb. Use of Multilingual Dictionary in a Single Level Method of Selecting Translations of Terms Using Hierarchical Topical Codes 1) Association of Dictionary Entries with a Textual Object in a First Language Given a first language wstring wsLang1String of length lenL1S, at each position m in the wstring, the index file is searched for first language terms that match wsLang1String starting at position m and copies of these dictionary records are then read into active memory as follows:

a) A CPtrArray paMaster (as described in MVS), is constructed with length lenL1S and initialized with NULL at each position in the array. In operation, this will become an array of arrays, with a CPtrArray paRecords of dictionary records at each position in this array.

Example of paMaster before adding dictionary records, Table 8:

TABLE 8

| | |
|---|---|
| paMaster[0] | NULL |
| (intervening paMasters) | (all NULL) |
| paMaster[m] | NULL |
| paMaster[m + 1] | NULL |
| (intervening paMasters) | (all NULL) |
| paMaster[lenL1S-1] | NULL |

In this example, NULL entries remain where no matching dictionary entries were found.

An example of a paRecord after adding dictionary records is shown below. In this case, three matching records were found and copied into active memory, Table 9.

TABLE 9

| | |
|---|---|
| paRecord[0] | Pointer to first record |
| paRecord[1] | Pointer to second record |
| paRecord[2] | Pointer to third record | b) Starting from position 0 in wsLang1String, the index file is searched following the method described in Knuth.

The records in the dictionary for which the first language term matches the substring of wsLang1String of the same length as the first language term are read into active memory as follows:

The record is parsed by sequentially reading each character of the record. Upon reading a <record>code, the program allocates memory for an instance of the class Entry. After reading the <lang1>code, the program places subsequent characters in wsL1Term until the </lang1>code is read. Likewise, after reading the <lang2>code, the program places subsequent characters in wsL2Term until the </lang2> code is read. After reading the <lang3> code, the program places subsequent characters in wsL3Term until the </lang3> code is read. After reading the <lang4> code, the program places subsequent characters in wsL4Term until the </lang4> code is read. Continuing, after reading the <topic> code, the program places subsequent characters in wsTopic until the </topic> code is read. Upon reading the </record> code, the program appends the pointer to this record to the CPtrArray at position 0. If this is the first record at that position, i.e., there is a NULL at that position, the program allocates a CPtrArray for the record and assigns its pointer to paMaster[0].

c) The procedure in b) is repeated for each position in wsLang1String. When these iterations are complete each position m of paMaster will contain either a NULL (if not matching dictionary records were found) or a pointer to a CPtrArray of dictionary records.

Example of paMaster after adding dictionary records, Table 10:

TABLE 10

| | |
|---|---|
| paMaster[0] | *paRecords ($0^{th}$) |
| (intervening paMasters) | (may include NULL) |
| paMaster[m] | *paRecords ($m^{th}$) |
| paMaster[m + 1] | NULL |
| (intervening paMasters) | (may include NULL) |
| paMaster[lenL1S-1] | *paRecords ( $(lenL1S-1)^{th}$) |
| | (may be NULL) |

2) Inserting Topical Codes Into a Structure that Allows for Counting their Frequencies of Occurrence For each member of the pointer array, a key consisting of the first three characters of the IPC code contained in wsTopic (i.e., the class code) are added to the map defined by:

map<wstring, int> STR2INT;

to get the map

STR2INT smapClassCode;

Following the teachings of MVS, the following C++ code segment is executed for each member of paMaster as follows:

```
for(int i = 0; i < lenL1S; i++)
{
    if( paMaster[i] ! = NULL )
    {
        int nRecords = paMaster[i].GetLength( ); //number of dictionary
        records copied
        CPtrArray* pRecords = paMaster [I];
        for( int j = 0; j < nRecords; j++)
        {
            Record* pRecord = pRecords[j];
            pair < wstring, int > newPair; //pair for insertion into
```

```
        smapClassCode
        newPair.first = pRecord- > wsTopic.left(3);
        newPair.second = 1;
        smapClassCode.insert( newPair );
      }
    }
}
```

3) Selecting Translations of Terms in Second, Third and Fourth Languages Using Frequencies of Topical Codes For each of the positions m of wsLang1String, if there is more than one matching first language terms from the dictionary, the number of occurrences of the first three characters of the IPC code in smapClassCode for the matching first language terms are compared. The term with the most frequent IPC key is selected.

For the particular example of paRecord shown above, the following C++ code segment selects the record with the most frequently occurring IPC code:

```
int nMostFrequent = 0; //initialize to first record in paRecord
int nMaxCount = 0; //for following the maximum count
for( int i = 0; i < paRecord.GetLength( ); i++)
{
    Record* pRecord = pRecords[i];
    wstring wsTest = pRecord- > wsTopic.left(3);
    int nCount = smapClassCode.count( wsTest );
    if( nCount > nMaxCount )
    {
        nMostFrequent = i;
        nMaxCount = nCount;
    }
}
```

Note that in this example, if more than one IPC class code has the same frequency the first of the two records to occur in pRecords is selected.

EXAMPLE III

Bilingual Electronic Dictionary Containing Multiple Hierarchical Topical Codes and Methods for Its Use Example IIIa. Bilingual Electronic Dictionary Containing Multiple Hierarchical Topical Codes 1) Structure of Dictionary Record in Storage With the character coding system being Unicode®, codes belonging to the user domain of the Unicode® system are selected as record and field delimiters as follows:

| <record>  | 0xe000 | //start of record |
| </record> | 0xe001 | //end of record |
| <lang1>   | 0xe011 | //start of first language term field |
| </lang1>  | 0xe021 | //end of first language term field |
| <lang2>   | 0xe013 | //start of second language term field |
| </lang2>  | 0xe023 | //end of second language term field |
| <topic>   | 0xe0a0 | //start of topical code field |
| </topic>  | 0xe0a1 | //end of topical code field |

In the list above, 0xE011 is a hexadecimal representation of the two-byte (16-bit) code consisting of the hexadecimal bytes E0 and 11.

A dictionary entry then has the following sequence of 16-bit codes:

<record><lang1>Japanese term </lang1><lang2>English term </lang2><topic>IPC code1</topic>(repeat n−1 times)<topic>IPC code n</topic></record>

The records in the dictionaries are selected and constructed by manually examining patents in many IPC classifications. For a particular patent in this Example, the language of the patent Japanese is taken as the first language and English is taken as the second language. For a given Japanese term in the patent, the Japanese term is entered into the first language term field and the English translation of that term which is most appropriate for the topic of the patent is entered into the second language term field. The inventive IPC classifications for the patent are entered into the topical code fields.

A simple parse routine known to persons knowledgeable in the field is used to read the dictionary record into active memory as described in below.

2) Dictionary File

The dictionary file consists of a sequence in storage of the above dictionary records. It also contains an array of offsets of the dictionary records so that the records can be addressed by the record location number contained in the node elements of the index file.

3) Index File

The index file for the aforesaid dictionary file is a multinodal tree made up of nodes and node elements as follows. There is one tree per language in the dictionary. If the dictionary is only to be used in one direction, for example, from the first language to the second language, only one tree for the source language need be present. Within each node, the node elements are arranged in Unicode® code order according to the key. Ordering of keys is determined by the Unicode® character order. The first 10 characters of a term are contained in the node element for speed. If the term is less than 10 characters in length, the key is terminated by a NULL. For terms 10 or more characters in length, the dictionary record is parsed into memory so that the full term can be compared. (This is a simple variant of the B-tree method disclosed in Donald E. Knuth, "The Art of Computer Programming, Volume 3, Sorting and Searching", Addison-Wesley, Reading, Mass., 1973, pp. 473–476, hereinafter "Knuth".) The choice of 127 elements makes the size of a node 4096 bytes which is the size of a memory page of the Windows® NT operating system as implemented on Intel x86 microprocessors. In the index file, the nodes are aligned on page boundaries so that a single file access reads a complete node into physical memory.

a) Node Class:

```
class Node
{
    DWORD       m_ThisNode; //number of this node
    DWORD       m_NumberOfElements; //number of node
                elements currently in node
    DWORD       m_MaxNumberOfElements;
    DWORD       m_ParentNode;
    DWORD       m_ParentElement; //number of parent element in
                parent node
    DWORD       m_FirstElement;
    DWORD       m_bBottomNode; //true if this is a bottom node
    DWORD       m_LastElement; //last element in linked list
    NodeElement m_Elements[127];
};
``` b) Node Element Class:

```
class NodeElement
{
    wchar_t    key[10];      //hold up to 10 characters from record
    DWORD      childNode;    //for keys less than this key
    DWORD      next;         //next element in node
    DWORD      record;       //number of record in dictionary
};
```

4) Structure of Dictionary in Active Memory

When associated with a textual object, the aforementioned dictionary record is parsed into an active object, for example a C++ object having the following member variables where "wstring" is a wide character (Unicode®) string according to MVS:

```
class Record
{
    wstringwsL1Term;     //term from first language
    wstringwsL2Term;     //term from second language
    vector<wstring>      vecTopics;    //array of topical code
                                        wstrings
}
```

Example IIIb. Use of bilingual dictionary in a single level method of selecting translations of terms using multiple hierarchical topical codes 1) Association of Dictionary Entries with a Textual Object in a First Language Given a first language wstring wsLang1String of length lenL1S, at each position m in the wstring, the index file is searched for first language terms that match wsLang1String starting at position m and copies of these dictionary records are then read into active memory as follows:

a) A CPtrArray paMaster (as described in MVS), is constructed with length lenL1S and initialized with NULL at each position in the array. In operation, this will become an array of arrays, with a CPtrArray paRecords of dictionary records at each position in this array.

Example of paMaster before adding dictionary records, Table 11:

TABLE 11

| | |
|---|---|
| paMaster[0] | NULL |
| (intervening paMasters) | (all NULL) |
| paMaster[m] | NULL |
| paMaster[m + 1] | NULL |
| (intervening paMasters) | (all NULL) |
| paMaster[lenL1S-1] | NULL | b) Starting from position 0 in wsLang1String, the index file is searched following the method described in Knuth.

The records in the dictionary for which the first language term matches the substring of wsLang1String of the same length as the first language term are read into active memory as follows:

The record is parsed by sequentially reading each character of the record. Upon reading a <record>code, the program allocates memory for an instance of the class Entry. After reading the <lang1> code, the program places subsequent characters in wsL1Term until the </lang1> code is to read. Likewise, after reading the <lang2> code, the program places subsequent characters in wsL2Term until the </lang2> code is read. Continuing, after reading the <topic> code, the program places subsequent characters in a wstring wsTopic until the </topic> code is read. This wstring is appended to the vector vecTopics. If there are additional topic codes, these are likewise read into a wstring wsTopic which is then appended to vecTopics. Upon reading the </record> code, the program appends the pointer to this record to the CPtrArray at position 0. If this is the first record at that position, i.e., there is a NULL at that position, the program allocates a CPtrArray for the record and assigns its pointer to paMaster[0].

c) The procedure in b) is repeated for each position in wsLang1String. When these iterations are complete each position m of paMaster will contain either a NULL (if not matching dictionary records were found) or a pointer to a CPtrArray of dictionary records.

Example of paMaster after adding dictionary records, Table 12:

TABLE 12

| | |
|---|---|
| paMaster[0] | *paRecords ($0^{th}$) |
| (intervening paMasters) | (may include NULL) |
| paMaster[m] | *paRecords ($m^{th}$) |
| paMaster[m + 1] | NULL |
| (intervening paMasters) | (may include NULL) |
| paMaster[lenL1S-1] | NULL |

In this example, NULL entries remain where no matching dictionary entries were found.

An example of a paRecord after adding dictionary records is shown below. In this case, three matching records were found and copied into active memory, Table 13.

TABLE 13

| | |
|---|---|
| paRecord[0] | Pointer to first record |
| paRecord[1] | Pointer to second record |
| paRecord[2] | Pointer to third record |

2) Inserting Topical Codes Into a Structure that Allows for Counting their Frequencies of Occurrence For each member of the pointer array, a key consisting of the first three characters of the IPC code contained in wsTopic (i.e., the class code) are added to the map defined by:

map<wstring, int> STR2INT;

to get the map

STR2INT smapClassCode;

Following the teachings of MVS, the following C++ code segment is executed for each member of paMaster as follows:

```
for( int i = 0; i < lenL1S; i++)
{
    if( paMaster[i] ! = NULL)
    {
        int nRecords = paMaster[i].GetLength( ); //number of dictionary
        records copied
        CPtrArray* pRecords = paMaster[I];
        for( int j = 0; j <nRecords; j++)
        {
            Record* pRecord = pRecords[j];
            vector < wstring > & vecTopics = pRecord- > vecTopics;
            for(int k = 0; k < vecTopics.size( ) ; k++)
            {
                wstring& wsTopic = vecTopics[k];
                pair < wstring, int > newPair; //pair for insertion into
                smapClassCode
                newPair.first = pRecord- > wsTopic.left(3);
```

-continued

```
        newPair.second = 1;
        smapClassCode.insert( newPair );
      }
    }
  }
}
```

3) Selecting Translations of Terms in Second Language Using Frequencies of Topical Codes For each of the positions m of wsLang1String, if there is more than one matching first language terms from the dictionary, the number of occurrences of the first three characters of the IPC code in smapClassCode for the matching first language terms are compared. The term with the most frequent IPC key is selected.

For the particular example of paRecord shown above, the following C++ code segment selects the record with the most frequently occurring IPC code:

```
int nMostFrequent = 0; //initialize to first record in paRecord
int nMaxCount = 0; //for following the maximum count
for( int i = 0; i < paRecord.GetLength( ); i++)
{
    Record* pRecord = pRecords[i];
    wstring wsTest = pRecord- > wsTopic.left(3);
    int nCount = smapClassCode.count( wsTest );
    if( nCount > nMaxCount)
    {
        nMostFrequent = i;
        nMaxCount = nCount;
    }
}
```

Note that in this example, if more than one IPC class code has the same frequency, the first of the two records to occur in pRecords is selected.

EXAMPLE IV

Bilingual Electronic Dictionary Containing Nonhierarchical Topical Codes and Methods for Its Use Example IVa. Bilingual Electronic Dictionary Containing Nonhierarchical Topical Codes 1) Structure of Dictionary Record in Storage With the character coding system being Unicode®, codes belonging to the user domain of the Unicode® system are selected as record and field delimiters as follows:

| <record> | 0xe000 | //start of record |
| </record> | 0xe001 | //end of record |
| <lang1> | 0xe011 | //start of first language term field |
| </lang1> | 0xe021 | //end of first language term field |
| <lang2> | 0xe013 | //start of second language term field |
| </lang2> | 0xe023 | //end of second language term field |
| <topic> | 0xe0a0 | //start of topical code field |
| </topic> | 0xe0a1 | //end of topical code field |

In the list above, 0xE011 is a hexadecimal representation of the two-byte (16-bit) code consisting of the hexadecimal bytes E0 and 11.

A dictionary entry then has the following sequence of 16-bit codes:

<record><lang1>Japanese term </lang1><lang2> English term </lang2><topic>topical code</topic></record>

The records in the dictionaries are selected and constructed by manually examining patents in many topical areas. Each patent is manually assigned to one of the topic codes listed in Appendix A of U.S. Pat. No. 5,873,056. For a particular patent in this embodiment, the language of the patent Japanese is taken as the first language and English is taken as the second language. For a given Japanese term in the patent, the Japanese term is entered into the first language term field and the English translation of that term which is most appropriate for the topic of the patent is entered into the second language term field. The manually assigned topic code for the patent is entered into the topical code field.

A simple parse routine known to persons knowledgeable in the field is used to read the dictionary record into active memory as described below.

2) Dictionary File

The dictionary file consists of a sequence in storage of the above dictionary records. It also contains an array of offsets of the dictionary records so that the records can be addressed by the record location number contained in the node elements of the index file.

3) Index File

The index file for the aforesaid dictionary file is a multinodal tree made up of nodes and node elements as follows. There is one tree per language in the dictionary. If the dictionary is only to be used in one direction, for example, from the first language to the second language, only one tree for the source language need be present. Within each node, the node elements are arranged in Unicode® code order according to the key. Ordering of keys is determined by the Unicode® character order. The first 10 characters of a term are contained in the node element for speed. If the term is less than 10 characters in length, the key is terminated by a NULL. For terms 10 or more characters in length, the dictionary record is parsed into memory so that the full term can be compared. (This is a simple variant of the B-tree method disclosed in Knuth.) The choice of 127 elements makes the size of a node 4096 bytes which is the size of a memory page of the Windows® NT operating system as implemented on Intel x86 microprocessors. In the index file, the nodes are aligned on page boundaries so that a single file access reads a complete node into physical memory.

a) Node Class

```
class Node
{
    DWORD m_ThisNode; //number of this node
    DWORD m_NumberOfElements; //number of node elements
      currently in node
    DWORD m_MacNumberOfElements;
    DWORD m_ParentNode;
    DWORD m_ParentElement; //number of parent element in parent
      node
    DWORD m_FirstElement;
    DWORD m_bBottomNode; //true if this is a bottom node
    DWORD m_LastElement; //last element in linked list
    NodeElement   m_Elements[127];
};
``` b) Node Element Class:

```
class NodeElement
{
    wchar_t key[10];   //hold up to 10 characters from record
    DWORD childNode;   //for keys less than this key
    DWORD next;        //next element in node
    DWORD record;      //number of record in dictionary
};
```

4) Structure of Dictionary in Active Memory

When associated with a textual object, the aforementioned dictionary record is parsed into an active object, for example a C++ object having the following member variables where "wstring" is a wide character (Unicode®) string according to MVS:

```
class Record
{
    wstring wsL1Term;   //term from first language
    wstring wsL2Term;   //term from second language
    wstring wsTopic;    //topical code
}
```

Example IVb. Use of Bilingual Dictionary in a Single Level Method of Selecting Translations of Terms Using Nonhierarchical Topical Codes 1) Association of Dictionary Entries with a Textual Object in a First Language.

Given a first language wstring wsLang1String of length lenL1S, at each position m in the wstring, the index file is searched for first language terms that match wsLang1String starting at position m and copies of these dictionary records are then read into active memory as follows:

a) A CPtrArray paMaster (as described in MVS), is constructed with length lenL1S and initialized with NULL at each position in the array. In operation, this will become an array of arrays, with a CPtrArray paRecords of dictionary records at each position in this array.

Example of paMaster before adding dictionary records, Table 14:

TABLE 14

| paMaster[0] | NULL |
|---|---|
| (intervening paMasters) | (all NULL) |
| paMaster[m] | NULL |
| paMaster[m + 1] | NULL |
| (intervening paMasters) | (all NULL) |
| paMaster[lenL1S-1] | NULL | b) Starting from position 0 in wsLang1String, the index file is searched following the method described in Knuth.

The records in the dictionary for which the first language term matches the substring of wsLang1String of the same length as the first language term are read into active memory as follows:

The record is parsed by sequentially reading each character of the record. Upon reading a <record> code, the program allocates memory for an instance of the class Entry. After reading the <lang1> code, the program places subsequent characters in wsL1Term until the </lang1> code is read. Likewise, after reading the <lang2> code, the program places subsequent characters in wsL2Term until the </lang2> code is read. Continuing, after reading the <topic> code, the program places subsequent characters in wsTopic until the </topic> code is read. Upon reading the </record> code, the program appends the pointer to this record to the CPtrArray at position 0. If this is the first record at that position, i.e., there is a NULL at that position, the program allocates a CPtrArray for the record and assigns its pointer to paMaster[0].

c) The procedure in b) is repeated for each position in wsLang1String. When these iterations are complete each position m of paMaster will contain either a NULL (if not matching dictionary records were found) or a pointer to a CPtrArray of dictionary records.

Example of paMaster after adding dictionary records, Table 15:

TABLE 15

| paMaster[0] | *paRecords ($0^{th}$) |
|---|---|
| (intervening paMasters) | (may include NULL) |
| paMaster[m] | *paRecords ($m^{th}$) |
| paMaster[m + 1] | NULL |
| (intervening paMasters) | (may include NULL) |
| paMaster[lenL1S-1] | NULL |

In this example, NULL entries remain where no matching dictionary entries were found.

An example of a paRecord after adding dictionary records is shown in Table 16 below. In this case, three matching records were found and copied into active memory.

TABLE 16

| paRecord[0] | Pointer to first record |
|---|---|
| paRecord[1] | Pointer to second record |
| paRecord[2] | Pointer to third record |

2) Inserting Topical Codes into a Structure that Allows for Counting their Frequencies of Occurrence For each member of the pointer array, a key consisting of the entire topical code contained in wsTopic is added to the map defined by:

map<wstring, int> STR2INT;

to get the map

STR2INT smapCode;

Following the teachings of MVS, the following C++ code segment is executed for each member of paMaster as follows:

```
for( int i = 0; i < lenL1S; i++)
{
    if( paMaster[i] ! = NULL )
    {
        int nRecords = paMaster[i].GetLength( ); //number of dictionary
        records copied
        CPtrArray* pRecords = paMaster[I];
        for( int j = 0; j < nRecords; j++)
        {
            Record* pRecord = pRecords[j];
            pair < wstring, int > newPair; //pair for insertion into
            smapCode
            newPair.first = pRecord- > wsTopic; //entire code because
            nonhierarchical
            newPair.second = 1;
            smapCode.insert( newPair );
        }
    }
}
```

3) Selecting Translations of Terms in Second Language Using Frequencies of Topical Codes For each of the positions m of wsLang1String, if there is more than one matching first language terms from the dictionary, the number of occurrences of the first three characters of the IPC code in smapClassCode for the matching first language terms are compared. The term with the most frequent IPC key is selected.

For the particular example of paRecord shown above, the following code segment selects the record with the most frequently occurring IPC code:

```
int nMostFrequent = 0; //initialize to first record in paRecord
int nMaxCount = 0; //for following the maximum count
for( int i = 0; i < paRecord.GetLength( ); i++)
{
    Record* pRecord = pRecords[i];
    wstring wsTest = pRecord- > wsTopic; //entire code because
    nonhierarchical
    int nCount = smapCode.count( wsTest );
    if( nCount > nMaxCount )
    {
        nMostFrequent = i;
        nMaxCount = nCount;
    }
}
```

Note that in this example, if more than one topical code has the same frequency the first of the two records to occur in pRecords is selected.

I claim:

1. An electronic dictionary comprising; a memory that contains a data structure composed of a plurality of records, each record comprising representations of the following:
   a first term, a second term, and a topical code, wherein said first term is in a first language, said second term is in a second language and said topical code indicates a topical area in which the second term is a translation of the first term,
   a record in the data structure having been generated by (a) providing a collection of textual objects in the first or second language, each textual object having been associated with one or more codes that identify a topic to which the textual object pertains, and (b) entering into the record representations of a term from the textual object, a topical code associated with the textual object, and the corresponding term from a translation of the textual object into the other language.

2. A method using an electronic dictionary of claim 1 for selecting topic-appropriate translations of terms in a textual object in a first language into a second language comprising the steps of:
   (a) providing an electronic dictionary of claim 1 containing records comprising representations of terms in said first language and said second language;
   (b) scanning a textual object in said first language to identify each occurrence of a term in said textual object in a record of said electronic dictionary;
   (c) inserting each topical code associated with each of said records identified in step (b) into a data structure that provides for counting of the frequency of occurrence of each topical code; and
   (d) whenever there occur a plurality of terms in the second language corresponding to a term in the first language, selecting the term associated with the most frequently occurring topical code.

3. The method of claim 2, wherein step (c) is performed by generating a table associating each topical code occurring in the textual object with its frequency of occurrence.

4. The method of claim 2, wherein step (c) is performed by the use of a map class.

5. The electronic dictionary of claim 1, each record further comprising a representation of the part of speech for said first term.

6. The electronic dictionary of claim 1, each record further comprising representations of: the language of said first term and the language of said second term.

7. The electronic dictionary of claim 1, wherein at least some of said records further comprise a representation of a third term, said third term being a translation of the first term into a third language in the topical area of said topical code.

8. The electronic dictionary of claim 1, wherein one of said languages is Japanese and another language is English.

9. The electronic dictionary of claim 1, wherein at least one of said terms is represented in Unicode.

10. A method using an electronic dictionary of claim 9 for selecting topic-appropriate translations of terms in a textual object in a first language into a second language comprising the steps of:
    (a) providing an electronic dictionary of claim 9 containing records comprising representations of terms in said first language and said second language;
    (b) scanning a textual object in said first language to identify each occurrence of a term in said textual object in a record of said electronic dictionary;
    (c) inserting each topical code associated with each of said records identified in step (b) into a data structure that provides for counting of the frequency of occurrence of each topical code; and
    (d) whenever there occur a plurality of terms in the second language corresponding to a term in the first language, selecting the term associated with the most frequently occurring topical code.

11. The electronic dictionary of claim 1, wherein said topical code is a member of a hierarchical topical coding system.

12. The electronic dictionary of claim 11, wherein said hierarchical topical coding system is the International Patent Classification system.

13. A method of using an electronic dictionary of claim 11 for selecting topic-appropriate translations of terms in a textual object in a first language into a second language comprising the steps of:
    (a) providing an electronic dictionary of claim 11 containing records comprising representations of terms in said first language and said second language;
    (b) scanning a textual object in said first language to identify each occurrence of a term in said textual object in a record of said electronic dictionary;
    (c) inserting each topical code associated with each of said records identified in step (b) into a plurality of data structures that provide for counting of the frequency of occurrence of each hierarchical topical code at a plurality of levels of said hierarchy; and
    (d) whenever there occur a plurality of terms in the second language corresponding to a term in the first language, counting the frequency of the topical codes associated with each of said plurality of terms, and selecting the term associated with the most frequently occurring topical code;
  wherein step (d) is applied iteratively, first at a coarser level of the topical code hierarchy, then at successively more detailed levels of the topical code hierarchy until topical ambiguities are either completely resolved or resolved to the extent allowed by the most detailed level of the hierarchy.

14. The method of claim 13, wherein step (c) is performed by generating a plurality of tables associating at each of a plurality of selected levels of said hierarchy each topical code occurring in the textual object with its frequency of occurrence.

15. The method of claim 13, wherein step (c) is performed by the use of a plurality of map classes.

16. The electronic dictionary of claim 11, wherein at least one of said terms is represented in Unicode.

17. A method of using an electronic dictionary of claim 16 for selecting topic-appropriate translations of terms in a textual object in a first language into a second language comprising the steps of:
  (a) providing an electronic dictionary of claim 16 containing records comprising representations of terms in said first language and said second language;
  (b) scanning a textual object in said first language to identify each occurrence of a term in said textual object in a record of said electronic dictionary;
  (c) inserting each topical code associated with each of said records identified in step (b) into a plurality of data structures that provide for counting of the frequency of occurrence of each hierarchical topical code at a plurality of levels of said hierarchy; and
  (d) whenever there occur a plurality of terms in the second language corresponding to a term in the first language, counting the frequency of the topical codes associated with each of said plurality of terms, and selecting the term associated with the most frequently occurring topical code;
wherein step (d) is applied iteratively, first at a coarser level of the topical code hierarchy, then at successively more detailed levels of the topical code hierarchy until topical ambiguities are either completely resolved or resolved to the extent allowed by the most detailed level of the hierarchy.

18. The electronic dictionary of claim 11, wherein said hierarchical topical coding system is a technology classification system.

19. An electronic translator comprising:
  a electronic dictionary comprising a memory that contains a data structure composed of a plurality of records, each record comprising representations of a first term, a second term provided in a second language, and a topical code for records having plural meanings within a scope defined by the topical code, said topical code indicating a topical area of text for translation of the second term from the first term, and
  means for providing translation of a textual object composed of representations of terms in said first language into representations of terms in said second language, said means for providing translation comprising:
  (a) means for scanning a textual object in said first language to identify each occurrence of a term in said textual object in a record of said data structure;
  (b) means for inserting each topical code associated with each of said records identified in step (a) into a data structure that provides for counting of the frequency of occurrence of each topical code; and
  (c) means for selecting the term associated with the most frequently occurring topical code whenever there occur a plurality of terms in the second language corresponding to a term in the first language.

20. A method of generating a record in a translation dictionary composed of a plurality of records, each record representing a first term, a second term, and a topical code, wherein said first term is in a first language, said second term is in a second language and said topical code indicates a topical area in which the second term is a translation of the first term by:
  (a) providing a collection of textual objects in the first or second language, each textual object having been associated with one or more codes that identify a topic to which the textual object pertains, and
  (b) entering into the record representations of a term from the textual object, a topical code associated with the textual object, and the corresponding term from a translation of the textual object into the other language.

* * * * *

(12) EX PARTE REEXAMINATION CERTIFICATE (7804th)
United States Patent
Engel

(10) Number: US 6,490,548 C1
(45) Certificate Issued: Oct. 12, 2010

(54) MULTILINGUAL ELECTRONIC TRANSFER DICTIONARY CONTAINING TOPICAL CODES AND METHOD OF USE

(75) Inventor: Alan Engel, Rosemont, PA (US)

(73) Assignee: Paterra, Inc., Villanova, PA (US)

Reexamination Request:
No. 90/009,211, Jun. 30, 2008

Reexamination Certificate for:
Patent No.: 6,490,548
Issued: Dec. 3, 2002
Appl. No.: 09/311,925
Filed: May 14, 1999

(51) Int. Cl.
*G06F 17/28* (2006.01)

(52) U.S. Cl. .......................................... 704/10; 707/100
(58) Field of Classification Search ....................... 704/10
See application file for complete search history.

(56) References Cited

U.S. PATENT DOCUMENTS

| 4,814,988 A | 3/1989 | Shiotani et al. |
| 5,535,120 A | 7/1996 | Chong et al. ........... 364/419.03 |
| 5,612,872 A | 3/1997 | Fujita ......................... 395/752 |
| 5,848,386 A | 12/1998 | Motoyama ..................... 705/5 |

FOREIGN PATENT DOCUMENTS

| JP | S63-278174 A | 11/1988 |
| JP | S62-272360 A | 4/1989 |
| JP | 4111063 A | 4/1992 |
| JP | H05-257966 | 10/1993 |

OTHER PUBLICATIONS

IPC—based Japanese English Patent Term Expression Disctionary, Mar. 25, 1987.
American Classification Guide, Dec. 20, 1988.

*Primary Examiner*—Fred Ferris

(57) ABSTRACT

A multilingual electronic transfer dictionary provides for automatic topic disambiguation by including one or more topic codes in definitions contained the dictionary. Automatic topic disambiguation is accomplished by determining the frequencies of topic codes within a block of text. Dictionary entries having more frequently occurring topic codes are preferentially selected over those having less frequently occurring topic codes. When the topic codes are members of a hierarchical topical coding system, such as the International Patent Classification system, an iterative method can be used with starts with a coarser level of the coding system and is repeated at finer levels until an ambiguity is resolved. The dictionary is advantageously used for machine translation, e.g. between Japanese and English.

At the time of issuance and publication of this certificate, the patent remains subject to pending reissue application number 12/292,403 filed Nov. 18, 2008. The claim content of the patent may be subsequently revised in the reissue proceeding.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-4, 10, 13-15, 17 and 19 is confirmed.

Claims 1, 5-9, 11, 12, 16, 18 and 20 are cancelled.

* * * * *